United States Patent
Olivier et al.

(10) Patent No.: US 8,809,791 B2
(45) Date of Patent: Aug. 19, 2014

(54) CONTINUOUS TIME-OF-FLIGHT SCATTER SIMULATION METHOD

(75) Inventors: Patrick Olivier, Solon, OH (US); Parmeshwar Khurd, Shaker Heights, OH (US)

(73) Assignee: Koninklijke Philips N.V., Kindhoven (NL)

( * ) Notice: Subject to any disclaimer, the term of this patent is extended or adjusted under 35 U.S.C. 154(b) by 402 days.

(21) Appl. No.: 13/319,097

(22) PCT Filed: Apr. 14, 2010

(86) PCT No.: PCT/IB2010/051632
§ 371 (c)(1),
(2), (4) Date: Nov. 7, 2011

(87) PCT Pub. No.: WO2010/133985
PCT Pub. Date: Nov. 25, 2010

(65) Prior Publication Data
US 2012/0049053 A1    Mar. 1, 2012

Related U.S. Application Data

(60) Provisional application No. 61/179,820, filed on May 20, 2009.

(51) Int. Cl.
| G01T 1/164 | (2006.01) |
| G01T 1/166 | (2006.01) |
| G06T 11/00 | (2006.01) |
| G06T 1/00  | (2006.01) |

(52) U.S. Cl.
CPC .............. *G06T 11/005* (2013.01); *G06T 1/00* (2013.01)
USPC ................................. 250/363.03; 250/363.04

(58) Field of Classification Search
USPC ........................................ 250/363.03, 363.04
See application file for complete search history.

(56) References Cited

U.S. PATENT DOCUMENTS

| 4,559,597 A | 12/1985 | Mullani |
| 4,563,582 A | 1/1986 | Mullani |
| 4,980,552 A | 12/1990 | Cho et al. |
| 6,462,342 B1 | 10/2002 | Stearns |
| 6,590,213 B2 | 7/2003 | Wollenweber |
| 6,674,083 B2 | 1/2004 | Tanaka et al. |
| 7,129,496 B2 | 10/2006 | Stearns et al. |
| 7,397,035 B2 | 7/2008 | Watson |
| 7,471,813 B2 * | 12/2008 | Ulmer et al. .................. 382/128 |

(Continued)

FOREIGN PATENT DOCUMENTS

| WO | 9507517 A1 | 3/1995 |
| WO | 2008075037 A1 | 6/2008 |

OTHER PUBLICATIONS

Accorsi, Roberto et al., Optimization of a Fully 3D Single Scatter Simulation Algorithm for 3D PET, Physics in Medicine and Biology, 2004, pp. 2577-2598, IOP Publishing Ltd., UK.

(Continued)

*Primary Examiner* — Marcus Taningco
*Assistant Examiner* — Mindy Vu (57) ABSTRACT

A continuous time-of-flight scatter simulation method is provided, with a related method of correcting PET imaging data to compensate for photon scatter. Scatter contributions from each imaging pixel in a field of view may be calculated without binning data.

24 Claims, 4 Drawing Sheets

(56) References Cited

U.S. PATENT DOCUMENTS

| | | |
|---|---|---|
| 2005/0072929 A1 | 4/2005 | Chuang et al. |
| 2006/0163485 A1* | 7/2006 | Stearns et al. ........... 250/363.03 |
| 2008/0224050 A1 | 9/2008 | Thielemans et al. |
| 2008/0296505 A1 | 12/2008 | Cooke et al. |

OTHER PUBLICATIONS

Accorsi, Roberto et al., Implementation of a Single Scatter Simulation Algorithm for 3D PET: Application to Emission and Transmission Scanning, IEEE, 2003, pp. 816-820.

Barney, J.S. et al., Object Shape Dependent Scatter Simulations for PET, IEEE Transactions on Nuclear Science, Apr. 1991, pp. 719-725, vol. 38, Issue 2.

Bendriem, B. et al., A Technique for the Correction of Scattered Radiation in a PET System Using Time-of-Flight Information, Journal of Computer Assisted Tomography, Mar.-Apr. 1986, pp. 287-295, vol. 10, Issue 2.

Conti, Maurizio et al., Implementation of Time-of-Flight on CPS HiRez PET Scanner, 2004 IEEE Nuclear Science Symposium Conference Record, Oct. 2004, pp. 2796-2800, vol. 5, Issue 16.

Conti, Maurizio et al., First Experimental Results of Time-of-Flight Reconstruction on an LSO PET Scanner, Physics in Medicine and Biology, Oct. 2005, pp. 4507-4526, vol. 50, Issue 19.

Conti, Maurizio et al., Component-Based Normalization for Panel Detector PET Scanners, IEEE Transactions on Nuclear Science, Feb. 2004, pp. 16-20, vol. 51, Issue 1.

Greengard, Leslie et al., The Fast Gauss Transform, SIAM Journal on Scientific and Statistical Computing, 1991, pp. 79-94, vol. 12, Issue 1, Society for Industrial and Applied Mathematics, Philadelphia, PA.

Hiltz, L. G. et al., Scatter Correction for Three-Dimensional PET Based on an Analytic Model Dependent on Source and Attenuating Objection, Physics in Medicine and Biology, Nov. 1994, pp. 2059-2071, vol. 39, Issue 11, IOP Publishing Ltd.

Kimdon, J.A. et al., Effect of Random and Scatter Fractions in Variance Reduction Using Time-of-Flight Information, Nuclear Science Symposium Conference Record, Oct. 2003, pp. 2571-2573, vol. 4, Issue 19.

Moses, W.W., Time of Flight in PET Revisited, IEEE Transactions on Nuclear Science, Oct. 2003, pp. 1325-1330, vol. 50, Issue 5.

Ollinger, John, Model-Based Scatter Correction for Fully 3D PET, Physics in Medicine and Biology, Jan. 1996, pp. 153-176, vol. 41.

Ollinger, John et al., Model-Based Scatter Correction for Fully 3D PET, 1993 IEEE Medical Imaging Conference Record, 1994, pp. 1264-1268.

Pratx, Guillem et al., Fast, Accurate and Shift-Varying Line Projections for Iterative Reconstruction using the GPU, IEEE Transactions on Medical Imaging, Mar. 2009, pp. 435-445, vol. 28, Issue 3.

Wang, W. et al., Systematic and Distributed Time-of-Flight List Mode PET Reconstruction, Nuclear Science Symposium Conference Record, Oct.-Nov. 2006, pp. 1715-1722, vol. 3.

Watson, Charles C., New, Faster, Image-Based Scatter Correction for 3D PET, IEEE Transactions on Nuclear Science, Aug. 2000, pp. 1587-1594, vol. 47, Issue 4.

Watson, Charles C., Extension of Single Scatter Simulation to Scatter Correction of Time-of-Flight PET, IEEE Nuclear Science Symposium Conference Record, Oct. 2005, pp. 2492-2496, vol. 5, Issue 23.

Watson, Charles C. et al., Advances in Scatter Correction for 3D PET/CT, IEEE Nuclear Science Symposium Conference Record, Oct. 2004, pp. 3008-3012, vol. 5, Issue 16.

Watson, Charles C. et al., A Single Scatter Simulation Technique for Scatter Correction in 3D PET, Three-Dimensional Image Reconstruction in Radiation and Nuclear Medicine, 1996, pp. 255-268, eds. Grangeat & Amans, Kluwer Academic Publishers, Dordrecht.

Watson, Charles C. et al., Evaluation of Simulation-Based Scatter Correction for 3-D PET Cardiac Imaging, IEEE Transactions on Nuclear Science, Feb. 1997, pp. 90-97, vol. 44, Issue 1.

Werling, Alexander et al., Fast Implementation of the Single Scatter Simulation Algorithm and its Use in Iterative Image Reconstruction of PET Data, IEEE, 2000, pp. 1158-1162.

Werner, Matthew E. et al., Implementation and Evaluation of a 3D PET Single Scatter Simulation with TOF Modeling, IEEE Nuclear Science Symposium Conference Record, Oct.-Nov. 2006, pp. 1768-1773, vol. 3.

\* cited by examiner

CONTINUOUS TIME-OF-FLIGHT SCATTER SIMULATION METHOD

CROSS REFERENCE TO RELATED APPLICATIONS

This application claims the benefit of U.S. provisional application Ser. No. 61/179,820 filed May 20, 2009, which is incorporated herein by reference.

The present application relates generally to the imaging arts, and in particular to photon scatter correction in time-of-flight positron emission tomography (PET) scanners. It provides a continuous time-of-flight scatter simulation method, and a related method of correcting PET imaging data to compensate for photon scatter. It thus applies to single modality PET scanners and dual modality PET scanners like PET/CT systems and PET/MR systems.

PET produces an image or picture of internal functional processes, typically in a human or animal subject. To obtain a PET image of a patient, a radiopharmaceutical is first injected into the patient. The radiopharmaceutical contains a tracer which binds itself to an active molecule of interest within the patient's body, such as glucose. The radiopharmaceutical also emits positrons. As an emitted positron collides with an electron from a nearby (typically ~1 mm) atom, the positron and the electron annihilate each other. As a result of the annihilation, two different light particles or photons are emitted in substantially opposite directions. The photons both travel at the same speed, the speed of light indexed for the medium they are passing through.

Figure 1A:
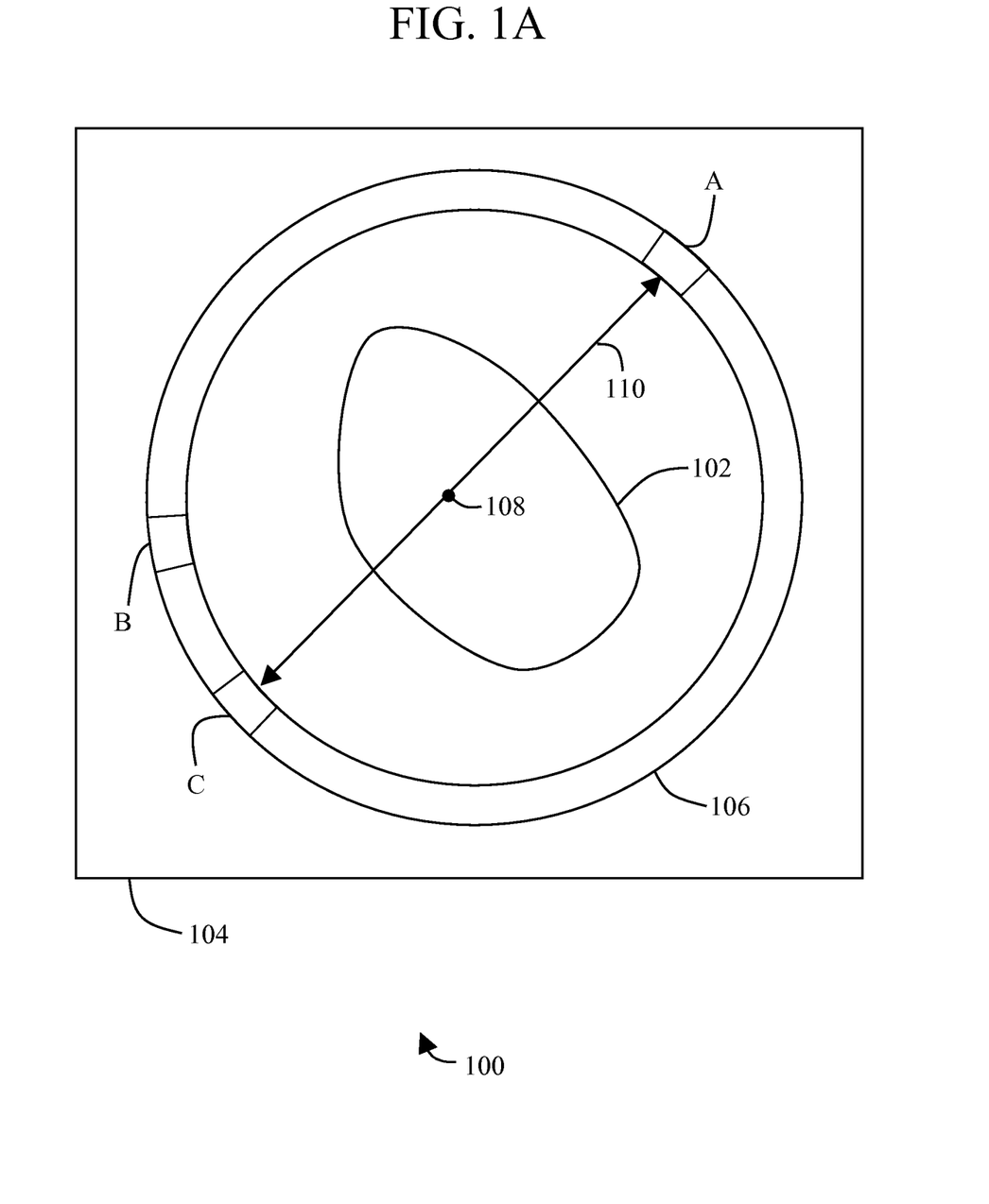
FIGS. 1A and 1B respectively illustrate a true coincidence and a scattered coincidence in an exemplary PET system 100.
Figure 1B:
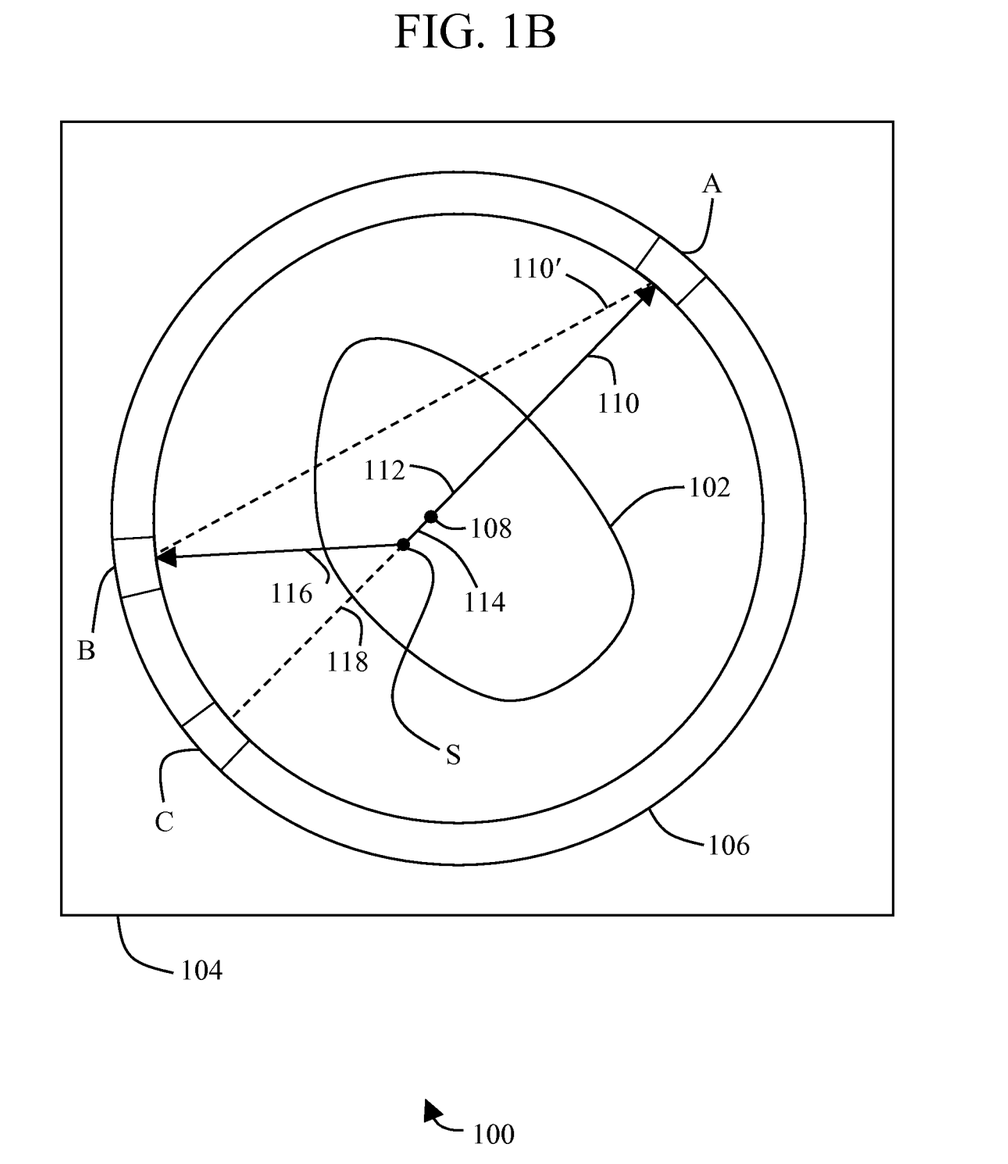

FIGS. 1A and 1B schematically illustrate a PET scanner 100. A patient or an imaged object 102 is placed within a gantry 104 of the PET scanner 100. The gantry 104 contains several photon detectors disposed in a ring 106 around the patient 102 to detect photon pairs emitted by positron-electron annihilations 108. For the sake of simplicity, the figures herein illustrate 2-dimensional systems. But the concepts being illustrated apply equally well to the 3-dimensional world. Only three photon detectors A, B and C are shown in FIGS. 1A and 1B. In an actual PET system 100, a detector ring 106 will typically have several detectors, and also there may typically be many detector rings set side by side.

A given detector such as the detector A, including associated electronics, is able to very accurately identify the time at which it detects a photon. If two detectors such as the detectors A and C in FIG. 1A each record receipt of a photon within a given coincidence time period, it is assumed that the pair of photons resulted from a positron-electron annihilation event such as 108. In particular, it is assumed that the annihilation 108 occurred somewhere along the straight line connecting the detectors A and C, called the "line of response" 110 as shown in FIG. 1A. Such pairs of detection events, or "coincidences", are recorded by the PET system 100. Using image reconstruction algorithms executed by a computer, the PET system 100 can use such coincidence events to determine the distribution of the radiopharmaceutical in the patient. That distribution is used to generate a PET image.

In recent years, the availability of fast and efficient detectors and improved digital front-end electronics has provided the capability of measuring "time-of-flight" information with clinical PET scanners 100. In time-of-flight PET imaging, a coincidence event is acquired by two detectors such as A and C along with the difference in arrival time of the two coincident photons. Because the two coincident photons both travel at the same speed, the arrival time difference has a direct correlation to the time of flight of the photons from the annihilation point 108 to the coincident detectors A and C. This time-of-flight information predicts the most likely point of origination of an annihilation such as 108 on the line of response 110. In conventional non-time-of-flight PET imaging, it is only possible to know that the coincidence event 108 has taken place somewhere on the line of response 110, without any more precise information concerning exactly where along the line 110.

The contributions to the imaging signal corresponding to the line of response 110 between the detectors A and C can come from three different types of events: true coincidence events such as shown in FIG. 1A, scattered coincidence events such as shown in FIG. 1B, and random coincidence events. The random coincidence events can be accounted for separately from scattering, so they are not discussed further here. FIG. 1B illustrates two photons being emitted from a positron-electron annihilation point 108, along initial paths 112 and 114. One photon continues along the path 112 to be detected by the detector A. The other photon undergoes Compton scattering at point S when it encounters an atom or molecule, so it changes direction to a scattered path 116. As a result of scattering at S, the photon is diverted from the path 118 which would have led to the detector C. So if the scatter at S is not taken into account, the PET system 100 will incorrectly treat the coincidence between detectors A and B as resulting from an annihilation along an observed straight line of response 110' between the two detectors A and B. Instead, the annihilation 108 in fact occurred along the straight line of response 110 between the detectors A and C. This incorrect assumption will lead to errors in the resulting PET image. Thus, the PET system's image reconstruction algorithm will lead to more accurate results if the processing is able to account for such scattered photons.

There are several known methods of accounting for scatter in time-of-flight PET imaging. These known methods include the disclosures of Bendriem et al., "A Technique for the Correction of Scattered Radiation in a PET System Using Time-of-Right Information," *J. Comput. Assist. Tomgr.*, 10: 287-295 (1986); Werner et al., "Implementation and Evaluation of a 3D PET Single Scatter Simulation with TOF Modeling", *IEEE Nuclear Science Symposium Conference Record*, 3: 1768-1773 (2006); U.S. Pat. No. 7,129,496 to Stearns et al.; and U.S. Pat. No. 7,397,035 to Watson et al. Many of these known methods apply single scatter simulation (SSS) models to estimate photon scatter. Such models assume one of two coincident photons is un-scattered, and the other coincident photon is scattered only once. From the imaged subject's emission distribution and attenuation medium, as recorded by the PET system 100, the SSS determines the probability of a single scatter event such as S contributing to an emission signal recorded by any two detectors A, B in the PET scanner 100. To reduce the required computing time, the SSS may include only the pairs of detectors defining a line of response 110 or 110' between them which passes through the imaged subject 102.

Many of the known SSS implementations use a time-of-flight binning approach. According to a binning approach, a pre-selected number of bins (n) and a given time window ($\Delta T$) determine a bin size ($\tau$), according to the following equation:

$$n\tau = \Delta T \qquad \text{(Eq. 1)}$$

As an example, 24 time-of-flight bins (n=24) with a coincidence time window of 6 nanoseconds ($\Delta T$=6 ns) define a time-of-flight bin size of 250 picoseconds ($\tau = \Delta T/n = 250$ ps). According to such binning schemes, when blurring by the time-of-flight kernel, a sampled version of the time-of-flight kernel has to be used.

The present invention provides a continuous time-of-flight SSS, rather than a binned time-of-flight SSS, and a related method of correcting time-of-flight PET imaging data to compensate for photon scatter. By directly using time-of-flight information without the further processing required for the binning approach, the present method gives a better scatter estimation and improves the quality of PET images in oncology, cardiology, neurology, and other imaging applications. Moreover, it blurs the scatter or emission estimation using a continuous time of flight blurring kernel, preferably a Gaussian function, rather than the sampled versions. Additional benefits and advantages will be readily understood by one of ordinary skill from the following description.

Thus, in one aspect, a method of correcting time-of-flight PET imaging data acquired by photon detectors in a PET scanner to account for photon scatter is provided, wherein a field of view of the PET scanner is divided into basis functions, and one or more scattering points is identified in order to apply a scatter simulation model, the method comprising for each photon scattering point, defining a scatter path connecting the photon scattering point with at least one pair of photon detectors, calculating a scatter contribution to the PET imaging data recorded by the at least one pair of photon detectors from each basis function in a set of basis functions located along the scatter path, such that the scatter contribution from any one basis function is calculated independently from the scatter contribution from other basis functions. A related PET imaging system is also provided.

Figure 2:
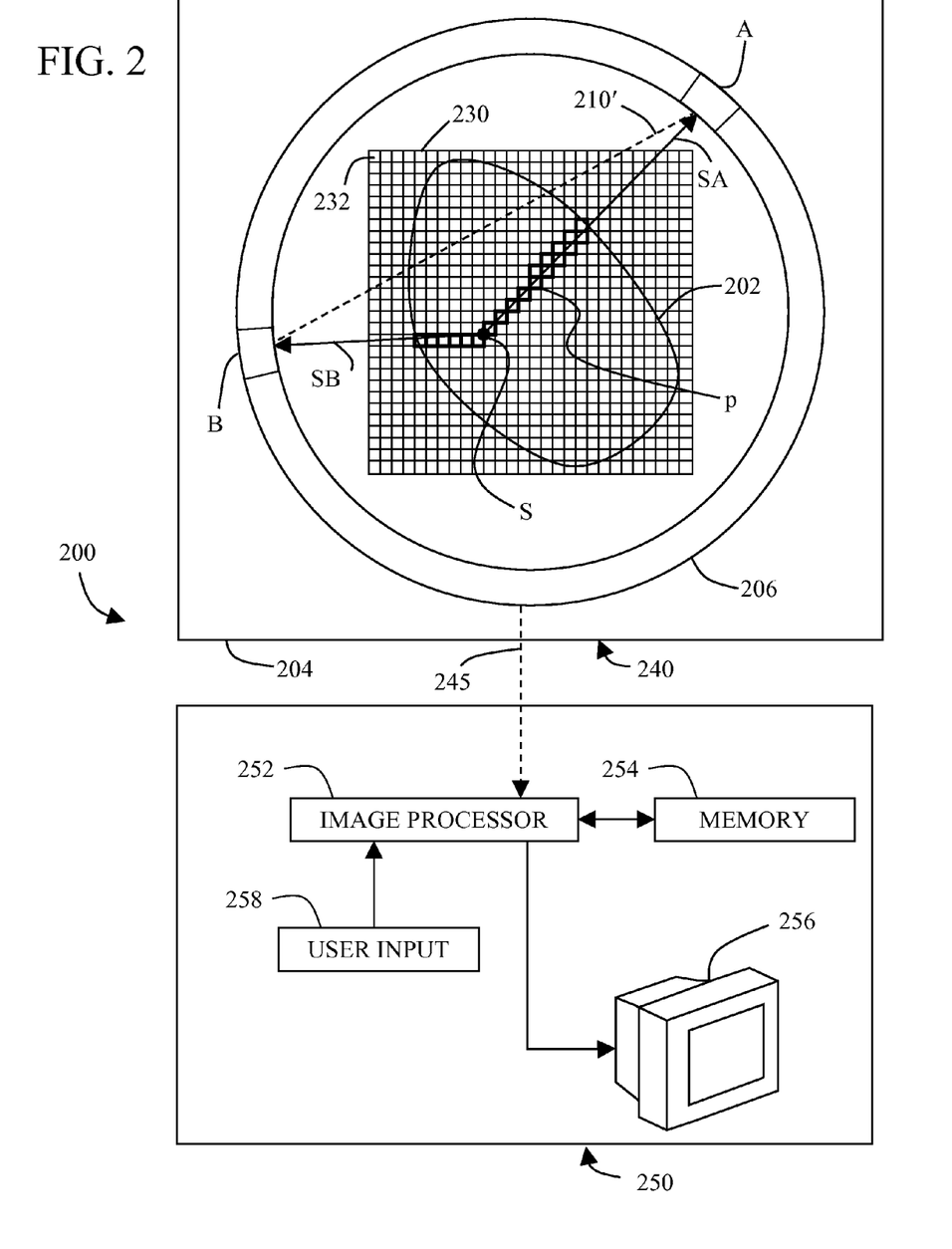
FIG. 2 illustrates a PET system 200 with a pixilated field of view 230.

One example of a PET imaging apparatus 200 for performing a PET imaging scan is shown in FIG. 2. A PET imaging acquisition system 240 includes a gantry 204 which receives a patient or other object 202 to be imaged in an aperture. The gantry 204 contains several photon detectors disposed in a ring 206 around the patient 202 to detect coincident photon pairs emitted by positron-electron annihilations. Two such detectors A and B are shown in FIG. 2. In an actual PET system 200, a detector ring 206 will typically have several detectors, and also there may typically be many detector rings set side by side.

The PET imaging acquisition system 240 passes PET imaging data recorded by the ring 206 of detectors such as A and B on to a PET imaging, processing and display system 250 through a communication link 245. Although the systems 240 and 250 are shown and described here as being separate systems for purposes of illustration, they may in other embodiments be part of a single system. The PET imaging data passes to an image processor 252 which stores the data in a memory 254. The image processor 252 electronically processes the PET imaging data to generate images of the imaged patient or other object 202. The image processor 252 can show the resulting images on an associated display 256. A user input 258 such as a keyboard and/or mouse device may be provided for a user to control the processor 252.

The aforementioned functions, and the processes described below, can be performed as software logic. "Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory such as memory 254, part of an operating system or other type of executable instructions. It will be appreciated by one of ordinary skill in the art that the form of software is dependent on, for example, requirements of a desired application, the environment it runs on, and/or the desires of a designer/programmer or the like.

The systems and methods described herein can be implemented on a variety of platforms including, for example, networked control systems and stand-alone control systems. Additionally, the logic shown and described herein preferably resides in or on a computer readable medium such as the memory 254. Examples of different computer readable media include Flash Memory, Read-Only Memory (ROM), Random-Access Memory (RAM), programmable read-only memory (PROM), electrically programmable read-only memory (EPROM), electrically erasable programmable read-only memory (EEPROM), magnetic disk or tape, optically readable mediums including CD-ROM and DVD-ROM, and others. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

The field of view 230 of the PET imaging acquisition system 240 is divided into several pixels 232, used for reconstruction purposes to generate an image of the object 202 such as a human patient. More generally, the field of view 230 may be represented by a collection of basis functions, each representing a spatial distribution. Thus, such basis functions may be represented by 2-dimensional pixels such as shown in FIG. 2, or by corresponding 3-dimensional voxels, or by a series of Gaussian functions corresponding to spatial distributions, and the like. Although this detailed description focuses on using 2-dimensional pixels, the present invention in its broadest aspect is not so limited. A pixel is but one type of basis function, taken herein as a representative example for purposes of illustration.

To implement an SSS algorithm, one or more potential scattering points S are chosen and distributed to cover at least the extent of the scanned object 202. One such scattering point S is shown in FIG. 2. Increasing the number of chosen scattering points S will increase the accuracy of the SSS algorithm, but will also increase the computing power required to perform the SSS algorithm. An attenuation map may be utilized to help dynamically determine scattering points S, for example by increasing the scatter point S density in regions of high attenuation. One of ordinary skill will be able to choose an appropriate number of scattering points S to balance these competing considerations in a given application of the SSS algorithm.

The two ray traces leading from the scattering point S in FIG. 2 to each of two coincident detectors A and B are respectively identified as SA and SB. Thus, a positron-electron annihilation occurring somewhere along the scatter path ASB leads to an observed coincidence between the two detectors A and B with an observed line of response 210'. As can be seen, the two ray traces SA and SB cross the scanned object 202 at several pixels p within the field of view 230; these pixels p are shown in heavy lines in FIG. 2. Each of the pixels p crossed by the ray traces SA and SB is the source of some radioactivity intensity or emission E and has an associated time-of-flight value corresponding to the scatter path ASB.

Figure 3:
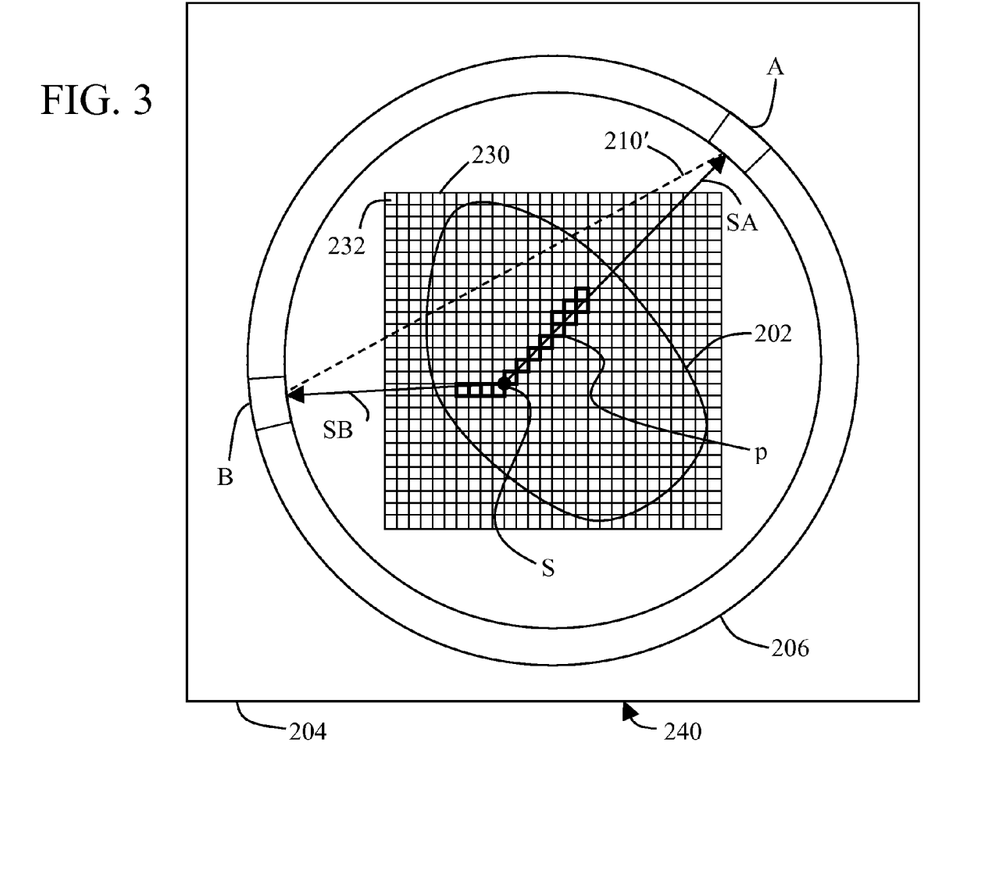
FIG. 3 illustrates application of a windowing technique applied in the PET system 200.

In one embodiment, as illustrated in FIG. 3, some of the emission pixels p along the scatter path ASB may be sub-selected based on a time-of-flight windowing criteria. Such windowing of time-of-flight PET data is discussed further in U.S. patent application Ser. No. 12/159,795, filed Jul. 1, 2008 and published as US 2008/0296505, hereby incorporated by reference. According to this embodiment, each emission pixel p along the scatter path ASB having an associated time-of-flight value which is not in the pre-defined time-of-flight window is not considered in the estimation of the SSS. This embodiment may be advantageous in some situations to reduce the computer processing power and time required to perform the SSS. The time-of-flight window may be chosen, for example, so that the pixels p have a time-of-flight $TOF_{s,p}$ within the coincidence window. In another embodiment, the time-of-flight window may be chosen to be even smaller, because most of the emission intensity of interest will come from pixels p in a specific region of the imaged object 202. The region of interest will vary based on the particular imaging application. For example, in an oncology study the region of particular interest is the region surrounding a tumor, which may be relatively small such as on the order of several centimeters.

Each pixel p has an associated time-of-flight value $TOF_{S,p}$ in relation to the scatter path ASB defined by a scattering point S and a pair of detectors A, B. Each pixel p also has an emission intensity $E_{S,p}$ as measured by the PET scanner 200. The set of these pixels p corresponding to a scatter point S, and a corresponding scatter path ASB and detector pair A, B, is denoted by:

$$p \in P_S \quad \text{(Eq. 2)}.$$

As already discussed in connection with FIG. 3, this set $P_S$ may be limited to pixels p within a particular time window.

Then the single scatter contribution to an emission intensity as recorded by any given detector pair A, B in the ring 206 from a scattering point S and a pixel p is, if the pixel p lies on the ray trace SA:

$$SSS_{S,p} = \left(\frac{\sigma_{AS}\sigma_{BS}}{4\pi R_{AS}^2 R_{BS}^2}\right)\frac{\mu_C}{\sigma_C}\frac{d\sigma_C}{d\Omega}\varepsilon_{AS}\varepsilon'_{BS}e^{-\int_S^A \mu ds}e^{-\int_S^B \mu' ds}E_{S,p} \quad \text{(Eq. 3)}$$

where:
- $\sigma_{AS}$ is the geometrical cross-section of the detector A for photons approaching along the ray trace SA;
- $\sigma_{BS}$ is the geometrical cross-section of the detector B for photons approaching along the ray trace SB;
- $R_{AS}$ is the distance from S to A;
- $R_{BS}$ is the distance from S to B;
- $\mu_C$ is the linear attenuation coefficient related to Compton interactions;
- $\sigma_C$ is the Klein-Nishina total cross-section related to Compton interactions;
- $d\sigma_C/d\Omega$ is the Klein-Nishina differential cross-section related to Compton interactions;
- $\varepsilon_{AS}$ is the efficiency of detector A for photons approaching along the ray trace SA at the energy of the incident photon;
- $\varepsilon'_{BS}$ is the efficiency of detector B for photons approaching along the ray trace SB at the energy of the scattered photon;
- $\mu$ is the linear attenuation coefficients at the energy of the incident photon;
- $\mu'$ is the linear attenuation coefficients at the energy of the scattered photon; and
- s is an integration variable spanning the straight line between the integration limits.

Also, the single scatter contribution to an emission intensity as recorded by any given detector pair A, B in the ring 206 from a scattering point S and a pixel p is, if the pixel p lies on the ray trace SB:

$$SSS_{S,p} = \left(\frac{\sigma_{AS}\sigma_{BS}}{4\pi R_{AS}^2 R_{BS}^2}\right)\frac{\mu_C}{\sigma_C}\frac{d\sigma_C}{d\Omega}\varepsilon'_{AS}\varepsilon_{BS}e^{-\int_S^A \mu' ds}e^{-\int_S^B \mu ds}E_{S,p} \quad \text{(Eq. 4)}$$

where:
- $\varepsilon_{BS}$ is the efficiency of detector B for photons approaching along the ray trace SB at the energy of the incident photon; and
- $\varepsilon'_{AS}$ is the efficiency of detector A for photons approaching along the ray trace SA at the energy of the scattered photon.

Thus the single scatter contribution at an observed line of response 210' corresponding to any given detector pair A, B in the ring 206 is:

$$\{SSS_{S,p}, \forall S, \forall p \in P_S\} \quad \text{(Eq. 5)}.$$

As can be seen from Equation 5, the single scatter contribution is considered as a collection of discrete emission intensity contributions from the emissions of various pixels 232. For each combination of one scattering point S and one pixel p, there is an associated time-of-flight value $TOF_{S,p}$ corresponding to a given detector pair A, B. Thus the collection of scatter contributions defined in Equation 5 can also be described as a function of those time-of-flight values:

$$\{SSS(TOF_{S,p}) = SSS_{S,p}, \forall S, \forall p \in P_S\} \quad \text{(Eq. 6)}.$$

This collection of scatter contributions is not binned along the scatter path ASB. Rather, the collection defines the entire set of scatter contributions to a given detector pair A, B from all scattering points S and pixels p, as a function of the time of flight value $TOF_{S,p}$. There is no grouping together in Equations 5 and 6 of pixels p into collections or bins along a scatter path ASB for using common values within each bin to approximate or simplify the calculations. Thus, the scatter contribution from any one pixel p is calculated independently from the scatter contribution of other pixels p, in an iterative process.

The collection defined by Equations 5 and 6 is a non-smooth, discrete set of values. In some contexts, it may be useful to approximate the discrete collection defined by Equations 5 and 6 as a smooth function, for example by mollification. Mollifiers are functions used to create sequences of smooth functions approximating discretized functions. Given a function which is rather irregular such as the discrete collection defined by Equation 5 or 6, convolving it with a mollifier smoothes its discretized nature while still remaining close to the original discrete distribution.

Thus, the collection of Equations 5 and 6 may be approximated by the mollifier function:

$$TOF \to SSS(TOF) = \sum_{\forall S, \forall p \in P_S} SSS_{S,p} G(TOF - TOF_{S,p}) \quad \text{(Eq. 7)}$$

$$= \sum_{\forall S, \forall p \in P_S} SSS(TOF_{S,p}) G(TOF - TOF_{S,p}).$$

The value defined as SSS(TOF) in Equation 7 represents the estimated scatter contribution to the imaging signal recorded by the PET system 200 for a time-of-flight of TOF corresponding to two detectors A, B. $SSS_{S,p}$ or $SSS(TOF_{S,p})$ is the collection defined above in Equations 5 and 6. The function $$TOF \to G(TOF - TOF_{S,p}) = \frac{e^{-\frac{(TOF - TOF_{S,p})^2}{2\sigma^2}}}{\sigma\sqrt{2\pi}} \quad \text{(Eq. 8)}$$

is the time-of-flight blurring kernel centered at $TOF_{S,p}$.

Thus, for each line of response 210' and each time-of-flight value TOF along the line of response 210', the value SSS (TOF) may be inputted into the time-of-flight image reconstruction process to generate a scatter-corrected PET image. In practice, for each observed line of response 210' between two detectors A and B in the ring 206, the PET scanner 200 stores in memory several numerical quantities:

$$SSS_{S,p}, TOF_{S,p}, \forall S, \forall p \in P_S.$$

Then, during image reconstruction, the quantity SSS(TOF) in Equation 7 is evaluated at each TOF value along each line of response 210' using those quantities. The expression of Equation 7 is a mathematical representation of a continuous estimation of the single scatter simulation.

The summation of Equation 7 can be evaluated using any manner known in the art. In one such embodiment, the expression of Equation 7 may be used on its own in order to simulate scattered photons in a PET reconstruction. Thus, for example, the fast Gauss transform implementation developed in Leslie Greengard & John Strain, "The Fast Gauss Transform", *SIAM J. Sci. Stat. Comput.*, vol. 12, no. 1, pages 79-94, January 1991, hereby incorporated herein by reference, may be used.

In another embodiment, the expression of Equation 7 may be split into two separate sums to aid in the numerical calculations. For example, Equation 7 may be split into a first sum over the scattering points S and a second sum over the pixels p belonging to $P_S$:

$$SSS(TOF) = \sum_{\forall S} \sum_{\forall p \in P_S} SSS_{S,p} G(TOF - TOF_{S,p}). \quad \text{(Eq. 9)}$$

Then the list of all possible TOF values along a scatter path ASB can be partitioned into n subsets:

$$P_S = \cup_{k=1}^{n} P_S^k \quad \text{(Eq. 10)}$$

Thus the scattering contribution along a scatter path ASB at a time-of-flight value of TOF can be expressed as:

$$SSS(TOF) = \sum_{\forall S} \sum_{k=1}^{n} \sum_{\forall p \in P_S^k} SSS_{S,p} G(TOF - TOF_{S,p}). \quad \text{(Eq. 11)}$$

The third summation in Equation 11 is restricted to one subset of the partition and allows a polynomial approximation, of two degrees for example, of the Gaussian function $G(TOF - TOF_{S,p})$:

$$SSS(TOF) \cong \quad \text{(Eq. 12)}$$
$$\sum_{\forall S} \sum_{k=1}^{n} \sum_{\forall p \in P_S^k} SSS_{S,p} \left( \begin{array}{l} a_k + b_k \cdot (TOF - TOF_{S,p}) + \\ c_k \cdot (TOF - TOF_{S,p})^2 \end{array} \right).$$

$$SSS(TOF) \cong \quad \text{(Eq. 13)}$$
$$\sum_{\forall S} \sum_{k=1}^{n} \Bigg\{ (a_k + b_k \cdot TOF + c_k \cdot TOF^2) \sum_{\forall p \in P_S^k} SSS_{S,p}(TOF_{S,p}) -$$
$$(b_k + 2 \cdot c_k \cdot TOF) \sum_{\forall p \in P_S^k} TOF_{S,p} SSS_{S,p}(TOF_{S,p}) +$$
$$c_k \sum_{\forall p \in P_S^k} TOF_{S,p}^2 SSS_{S,p}(TOF_{S,p}) \Bigg\},$$

$$SSS(TOF) \cong \quad \text{(Eq. 14)}$$
$$\sum_{k=1}^{n} \Bigg\{ (a_k + b_k \cdot TOF + c_k \cdot TOF^2) \sum_{\forall S} \sum_{\forall p \in P_S^k} SSS_{S,p}(TOF_{S,p}) -$$
$$(b_k + 2 \cdot c_k \cdot TOF) \sum_{\forall S} \sum_{\forall p \in P_S^k} TOF_{S,p} SSS_{S,p}(TOF_{S,p}) +$$
$$c_k \sum_{\forall S} \sum_{\forall p \in P_S^k} TOF_{S,p}^2 SSS_{S,p}(TOF_{S,p}) \Bigg\}.$$

Equation 13 represents one example wherein the single scatter simulation is convolved before calculating the cumulative scatter contribution at all scattering points S. Equation 14 represents an alternative example, wherein the cumulative scatter contributions are first calculated and then convolved.

In practice, the three moments of the scatter distribution in Equations 13 and 14:

$$\sum_{\forall S} \sum_{\forall p \in P_S^k} SSS_{S,p}(TOF_{S,p}), \quad \text{(Eq. 15)}$$

$$\sum_{\forall S} \sum_{\forall p \in P_S^k} TOF_{S,p} SSS_{S,p}(TOF_{S,p}), \text{ and} \quad \text{(Eq. 16)}$$

$$\sum_{\forall S} \sum_{\forall p \in P_S^k} TOF_{S,p}^2 SSS_{S,p}(TOF_{S,p}), \quad \text{(Eq. 17)}$$

can be pre-calculated and stored in memory. Then they are used in applying Equation 13 or 14, to determine a continuous estimated single scatter contribution SSS(TOF) to the imaging signal recorded by the PET system 200 for a time-of-flight of TOF along a line of response 210'. The value SSS(TOF) of Equation 13 or 14 may simply be inputted into the time-of-flight image reconstruction process to iteratively generate a scatter-corrected imaging signal. In this way, the numerical calculations underpinning the use of Equation 13 or 14 can be made more efficient and, therefore, faster to implement using a computer processor.

In a further alternative embodiment, the continuous estimation of Equation 7, or the specific numerical implementation of Equation 7 set forth in Equations 13 or 14, may be combined with a conventional binning algorithm.

The methods of this disclosure may be applied to any positron emission detection device, in particular any time-of-flight positron emission tomography (PET) scanner or dual modality scanner incorporating a PET scanner. The methods are usually integrated with the reconstruction algorithms used to generate the images from the list of detected coincidence events between pairs of detectors A, B.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various components and arrangements of components, and in various steps and arrangements of steps. The drawings are only for purposes of illustrating the preferred embodiments and are not to be construed as limiting the invention.

Having thus described the preferred embodiments, the invention is now claimed to be:

1. A method of correcting time-of-flight PET imaging data acquired by photon detectors in a PET scanner to account for photon scatter, wherein a field of view of the PET scanner is divided into basis functions, and one or more scattering points (S) is identified in order to apply a continuous time-of-flight scatter simulation model, the method comprising:
   for each photon scattering point (S), defining a scatter path (ASB) connecting the photon scattering point (S) with at least one pair of photon detectors (A, B), and
   calculating a scatter contribution to the PET imaging data recorded by the at least one pair of photon detectors (A, B) from each basis function in a set ($P_S$) of basis functions (p) located along the scatter path (ASB), and wherein the scatter contribution from any one basis function (p) is calculated independently from the scatter contribution from other basis functions (p).

2. The method of claim 1, further comprising, for each photon scattering point (S), calculating the scatter contribution from each basis function (p) in the set ($P_S$) to the PET imaging data recorded by at least each pair of photon detectors (A, B) having a straight line of response connecting the pair of photon detectors (A, B) which passes through an imaged object.

3. The method of claim 1, wherein the set ($P_S$) of basis functions (p) corresponds to a time-of-flight window wherein the basis functions (p) have a time-of-flight ($TOF_{S,p}$) within a coincidence window of the PET scanner.

4. The method of claim 1, wherein the set ($P_S$) of basis functions (p) corresponds to a time-of-flight window having a distance along the scatter path (ASB) which is approximately equal to a region of interest in an imaged object.

5. The method of claim 1, wherein the scatter simulation model is a single scatter simulation.

6. The method of claim 1, wherein the scatter contributions from each basis function (p) in the set ($P_S$) corresponding to one pair of photon detectors (A, B) are mollified to generate a continuous function approximating the scatter contributions of the basis functions (p) in the set ($P_S$) to the imaging data recorded by the one pair of photon detectors (A, B).

7. The method of claim 6, wherein the mollification is performed by convolving the scatter contributions from each basis function (p) in the set ($P_S$) with a continuous blurring kernel function.

8. The method of claim 7, wherein the continuous blurring kernel function is a continuous Gaussian function.

9. The method of claim 7, further comprising approximating the continuous blurring kernel function with a polynomial expansion.

10. The method of claim 6, further comprising combining the continuous function approximating the scatter contributions of the basis functions (p) in the set ($P_S$) with a binning algorithm.

11. A PET imaging system which corrects time-of-flight PET imaging data acquired by photon detectors in the PET imaging system to account for photon scatter, wherein a field of view of the PET imaging system is divided into basis functions, and one or more scattering points (S) is identified in order to apply a continuous time-of-flight scatter simulation model, the system comprising:
   a computer readable medium configured to receive the time-of-flight PET imaging data acquired by the photon detectors, the computer readable medium comprising logic to:
      for each photon scattering point (S), define a scatter path (ASB) connecting the photon scattering point (S) with at least one pair of photon detectors (A, B), and
      calculate a scatter contribution to the PET imaging data recorded by the at least one pair of photon detectors (A, B) from each basis function in a set ($P_S$) of basis functions (p) located along the scatter path (ASB), wherein the scatter contribution from any one basis function (p) is calculated independently from the scatter contribution from other basis functions (p).

12. The system of claim 11, wherein the computer readable medium further comprises logic to, for each photon scattering point (S), calculate the scatter contribution from each basis function (p) in the set ($P_S$) to the PET imaging data recorded by at least each pair of photon detectors (A, B) having a straight line of response connecting the pair of photon detectors (A, B) which passes through an imaged object.

13. The system of claim 11, wherein the set ($P_S$) of basis functions (p) corresponds to a time-of-flight window wherein the basis functions (p) have a time-of-flight ($TOF_{S,p}$) within a coincidence window of the PET imaging system.

14. The system of claim 11, wherein the set ($P_S$) of basis functions (p) corresponds to a time-of-flight window having a distance along the scatter path (ASB) which is approximately equal to a region of interest in an imaged object.

15. The system of claim 11, wherein the scatter simulation model is a single scatter simulation.

16. The system of claim 11, wherein the computer readable medium further comprises logic to mollify the scatter contributions from each basis function (p) in the set ($P_S$) corresponding to one pair of photon detectors (A, B), and generate a continuous function approximating the scatter contributions of the basis functions (p) in the set ($P_S$) to the imaging data recorded by the one pair of photon detectors (A, B).

17. The system of claim 16, wherein the mollification is performed by convolving the scatter contributions from each basis function (p) in the set ($P_S$) with a continuous blurring kernel function.

18. The system of claim 17, wherein the continuous blurring kernel function is a continuous Gaussian function.

19. The system of claim 17, wherein the continuous blurring kernel function is approximated with a polynomial expansion.

20. The system of claim 16, wherein the computer readable medium further comprises logic to combine the continuous function approximating the scatter contributions of the basis functions (p) in the set ($P_S$) with a pixel binning algorithm.

21. A method of correcting time-of-flight PET imaging data acquired by photon detectors in a PET scanner to account for photon scatter, wherein a field of view of the PET scanner is divided into basis functions, and one or more scattering points (S) is identified in order to apply a continuous time-of-flight scatter simulation model, the method comprising:

for each photon scattering point (S), defining a scatter path (ASB) connecting the photon scattering point (S) with at least one pair of photon detectors (A, B), and calculating a scatter contribution to the PET imaging data recorded by the at least one pair of photon detectors (A, B) from each basis function in a set ($P_S$) of basis functions (p) located along the scatter path (ASB), mollifying the scatter contributions from each basis function (p) in the set ($P_S$) corresponding to one pair of photon detectors (A, B) to generate a continuous function approximating the scatter contributions of the basis functions (p) in the set ($P_S$) to the imaging data recorded by the one pair of photon detectors (A, B), wherein the mollification is performed by convolving the scatter contributions from each basis function (p) in the set ($P_S$) with a continuous blurring kernel function.

22. The method of claim 21, wherein the scatter simulation model is a single scatter simulation.

23. The method of claim 21, wherein the continuous blurring kernel function is a continuous Gaussian function.

24. The method of claim 21, further comprising approximating the continuous blurring kernel function with a polynomial expansion.

* * * * *